No. 897,120. PATENTED AUG. 25, 1908.
F. MATHEYER.
SAUSAGE MACHINE.
APPLICATION FILED APR. 14, 1908.
3 SHEETS—SHEET 3.
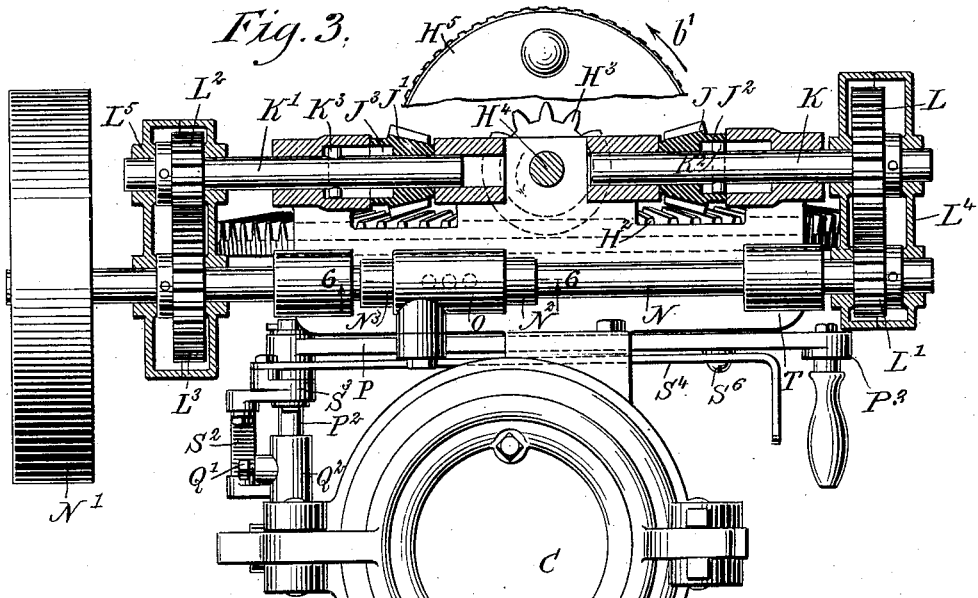
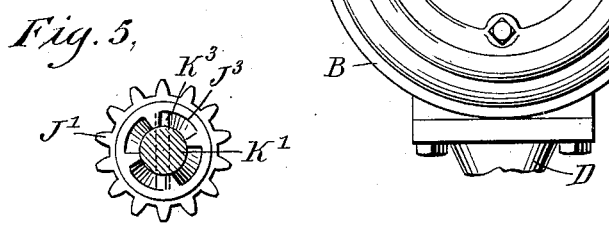
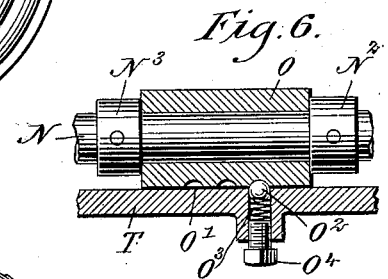
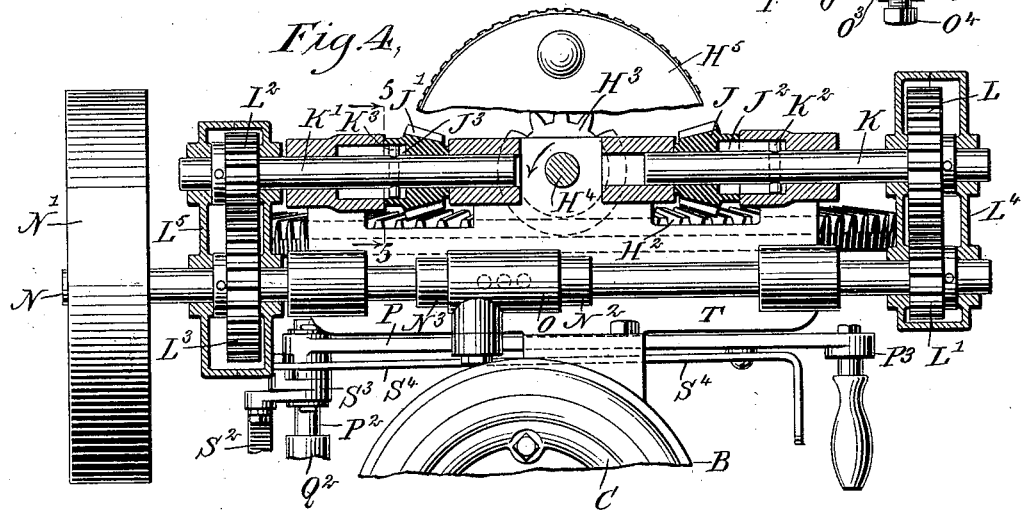
WITNESSES
Edward Thorpe
INVENTOR
Ferdinand Matheyer
BY Munn & Co
ATTORNEYS

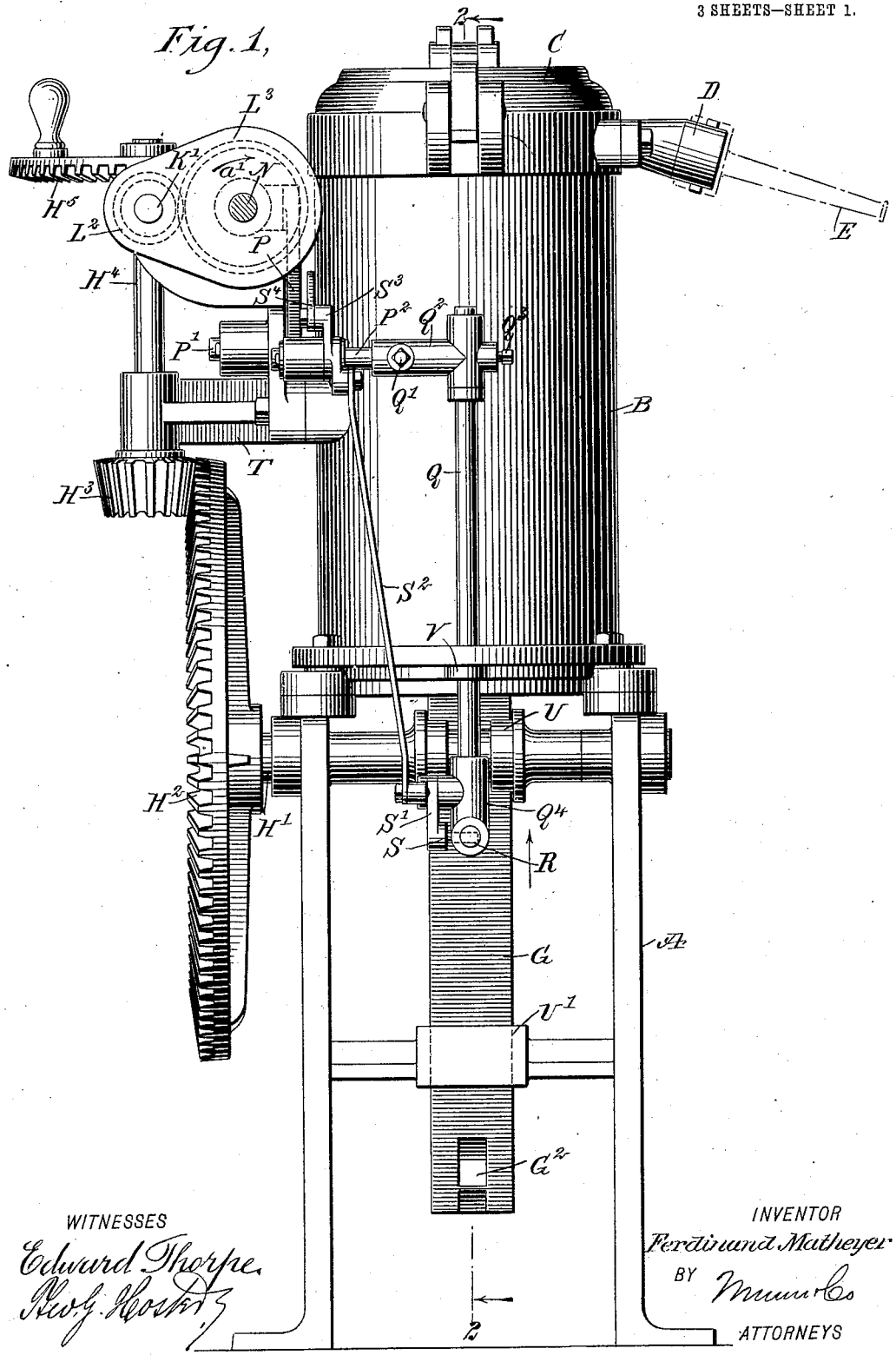

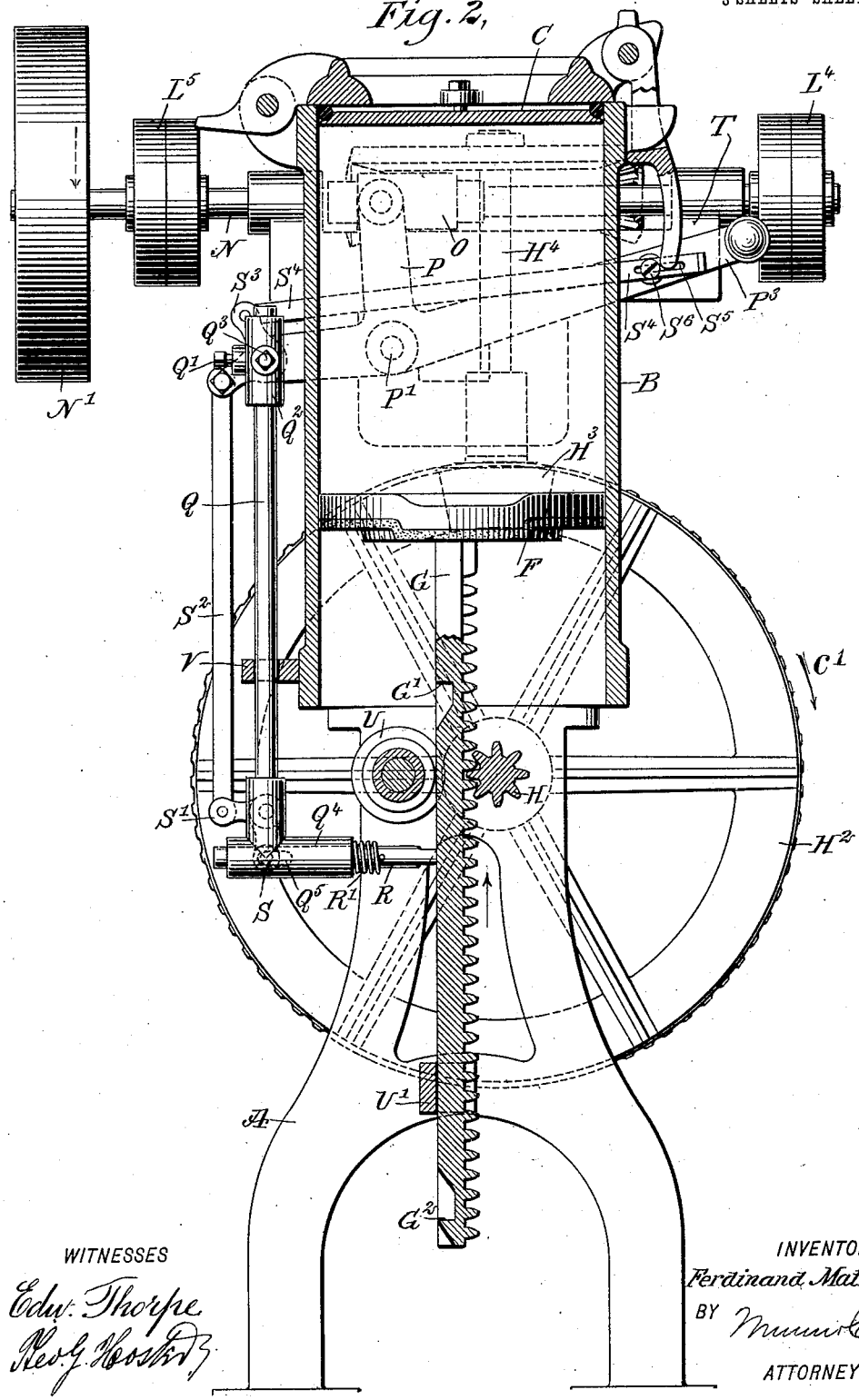

UNITED STATES PATENT OFFICE.

FERDINAND MATHEYER, OF NEW YORK, N. Y.

SAUSAGE-MACHINE.

No. 897,120.   Specification of Letters Patent.   Patented Aug. 25, 1908.

Application filed April 14, 1908. Serial No. 426,947.

*To all whom it may concern:*

Be it known that I, FERDINAND MA-THEYER, a citizen of the United States, and a resident of the city of New York, borough of Manhattan, in the county and State of New York, have invented a new and Improved Sausage-Machine, of which the following is a full, clear, and exact description.

The invention relates to butchering, and its object is to provide a new and improved sausage machine for filling or stuffing the meat into casings, and provided with a plunger reciprocating in a cylinder containing the meat, the plunger after starting the machine completing a full stroke for discharging the meat and then returning it to starting position to permit refilling of the cylinder, the movement of the plunger being positive, thus requiring no attention on the part of the attendant, to enable the latter to devote his whole attention to the application of the empty casings and the removal of the filled casings.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement and showing the main or driving shaft in section and the several parts in position for moving the plunger on the outward or filling stroke; Fig. 2 is a central section of the same on the line 2—2 of Fig. 1; Fig. 3 is a plan view of the same, part of the gearing being shown in section; Fig. 4 is a similar view of the same and showing the gearing in position for moving the plunger on the return stroke; Fig. 5 is an enlarged cross section of one of the clutch pinions, the section being on the line 5—5 of Fig. 4; and Fig. 6 is an enlarged sectional side elevation on the line 6—6 of Fig. 3 of the locking device for shifting the arm of the reversing mechanism.

On a suitably constructed frame A is mounted a cylinder B, open at its lower end, and adapted to be closed at the top by a suitable closure C, and at or near the upper end of the cylinder B is arranged a spout D for receiving a nozzle E, engaged by the casing to be filled or stuffed with the meat filled into the cylinder B and pressed out of the same on the upward stroke of a plunger F mounted to reciprocate within the cylinder B.

The plunger F is provided with a downwardly-extending rack G in mesh with a pinion H secured on a shaft H' journaled in suitable bearings held on the main frame A, and on the shaft H' is secured a bevel gear wheel $H^2$ in mesh with a bevel gear wheel $H^3$ attached to the lower end of a shaft $H^4$, provided at its upper end with a bevel gear wheel $H^5$ in mesh at opposite sides with clutch pinions J, J' mounted to rotate loosely on shafts K, K' respectively, having clutch members $K^2$, $K^3$ adapted to engage corresponding clutch members $J^2$, $J^3$ on the clutch pinions J and J'. The shaft K is connected by a gear wheel L with a pinion L' attached to the main driving shaft N, provided with a pulley N' connected by belt with other machinery for imparting a continuous rotary motion to the shaft N in the direction of the arrow $a'$. The shaft K' is provided with a pinion $L^2$ in mesh with a gear wheel $L^3$ secured on the shaft N, so that when the shaft N is rotated and the several parts are in the position shown in Fig. 3, then the rotary motion of the shaft N is transmitted by the pinion L' and the gear wheel L to the shaft K', connected by the clutch members $K^2$, $J^2$ with the pinion J which thus rotates the bevel gear wheel $H^5$ in the direction of the arrow $b'$. The rotary motion of the bevel gear wheel $H^5$ causes a rotation of its shaft $H^4$, so that the pinion $H^3$ turns the bevel gear wheel $H^2$ in the direction of the arrow $c'$, whereby the shaft H' and the pinion H impart an upward traveling motion to the rack G, thus moving the plunger F on the up-stroke. Now meat which had been previously filled into the upper end of the cylinder B is forced by the upwardly moving plunger F out through the spout D into the nozzle E and the casing to be filled or stuffed.

When the shaft N is rotated and the several parts are in the position illustrated in Fig. 4, then the clutch pinion J runs loose on its shaft K, while the shaft K' turned by the gear wheel $L^3$ and pinion $L^2$ on the main shaft N rotates the clutch pinion J', as the latter is now coupled to the shaft K' by the clutch members $K^3$, $J^3$. The rotary motion of the pinion J' is transmitted to the bevel gear wheel $H^5$ to rotate the latter and its shaft $H^4$ in the inverse direction of the arrow $b'$, whereby a rotary motion is transmitted by the pinion $H^3$, gear wheel $H^2$ and shaft H' to the pinion H in the inverse direction of the arrow $c'$, whereby the rack G is caused to move downward and with it the plunger F.

The gear wheel L and pinion $L'$ are arranged in a casing $L^4$ which moves with the shaft N, having a sliding motion in the direction of its length, and the pinion $L^2$ and the gear wheel $L^3$ are likewise mounted in a casing $L^5$ moving with the shaft N, so that when the latter is shifted a like shifting of the shafts K and $K'$ takes place, to connect or disconnect the shafts K and $K'$ with and from the corresponding clutch pinions J and $J'$.

It is understood that when the shaft N is in the position shown in Fig. 3, the shaft K is coupled to the clutch pinion J, while the shaft $K'$ and the clutch pinion $J'$ are disconnected, and when the shaft N is shifted to the position shown in Fig. 4, then the shaft K and the pinion J are disconnected, while the shaft $K'$ and the pinion $J'$ are connected with each other. In case the shaft N is moved to an intermediate position, then both clutch members $K^2$ and $K^3$ are out of mesh with the corresponding clutch members $J^2$, $J^3$ of the pinions J, $J'$, and the shaft N then runs idly and the plunger F is at a standstill and in its lowermost position.

In order to shift the main shaft N automatically, the following arrangement is made: On the shaft N are secured the collars $N^2$, $N^3$, between which is held a shifting arm O pivotally connected with a lever P fulcrumed at $P'$ and on which is secured a transversely extending rod $P^2$, on which is secured by the use of a set screw $Q'$ the head $Q^2$ of a slide Q, extending vertically, and provided at its lower end with a head $Q^4$, in which is mounted to slide a pin R engaging the back of the rack G. The pin R is pressed in contact with the rack G by a spring $R'$ (see Fig. 2), and the said pin R is engaged by a pin S projecting through an elongated slot $Q^5$ formed in the head $Q^4$. The pin S is held on a bell crank lever $S'$ fulcrumed on the head $Q^4$ and pivotally connected by a link $S^2$ with another bell crank lever $S^3$ fulcrumed loosely on the rod $P^2$, and the bell crank lever $S^3$ is pivotally connected with a rod $S^4$, having an elongated slot $S^5$ engaged by a screw $S^6$ held on the extension arm $P^3$ of the lever P, as plainly shown in Fig. 2. Now by the operator pulling the rod $S^4$ the pin R can be withdrawn, that is, moved out of engagement with the rack G to allow of removing the plunger F from the cylinder B for cleaning or other purposes, it being understood that when the pin R is withdrawn, the shoulder $G^2$ clears the pin R when lifting the plunger F out of the cylinder B.

The pin R is adapted to be engaged by shoulders $G'$ and $G^2$, spaced from each other on the back of the rack G near the upper and lower ends thereof, so that when the several parts are in the position shown in Figs. 1, 2 and 3, and the plunger adapted to move upward, then when the pin R is engaged by the shoulder $G^2$, it is carried upwardly and with it the slide Q, which latter now imparts a swinging motion to the shifting lever P, which by the shifting arm O moves the main driving shaft N from the left to the right into the position shown in Fig. 4. This takes place at the time the plunger F reaches the end of its up stroke, and as the gearing is now reversed the plunger F immediately starts on its down-stroke, and when the plunger F nears the end of its down stroke then the shoulder $G'$ moves in engagement with the pin R, which now is pushed downward, and with it the slide Q, thereby imparting a reverse swinging motion to the shifting lever P, which thus moves the shifting arm O and the shaft N from the right to the left. At this time the last upper tooth of the rack G is in mesh with the pinion H, so that the downward movement of the plunger F ceases at the time the shaft N has been shifted from the right to the left into an intermediate position, and consequently the shaft N runs idly and the plunger F remains at a standstill at the lower end of its return stroke. When this takes place the closure C can be opened and the cylinder B can be refilled with meat, after which the cylinder B is again closed at the top by the closure C, and then the operator swings the extension $P^3$ upward, so as to impart a swinging motion to the shifting lever P, which now moves the shifting arm O and the shaft N to the extreme left hand position, thus connecting the shaft K with the pinion J. When this takes place the plunger F is again caused to travel upward to push the meat out of the cylinder B by way of the spout D and nozzle E into the casing to be filled. From the foregoing it will be seen that by the arrangement described, the plunger F makes a complete up stroke and a return stroke without requiring any attention on the part of the attendant, and when the plunger F reaches the end of its down stroke it comes to a standstill, to enable the attendant to open the cylinder B and to refill the same with meat for another operation.

The shafts N, K and $K'$ are mounted to slide in suitable bearings held on a bracket T fastened to the cylinder B, the bracket also carrying the fulcrum $P'$ of the shifting lever P. The rack G engages with its back a roller U journaled on the main frame A, and the rack is also mounted to slide in a bearing $U'$ held on the main frame A. The slide Q is mounted to slide in a guideway V attached or formed on the cylinder B.

In order to hold the shifting arm O against accidental movement when in its end or intermediate position, the following locking device is provided, shown in detail in Fig. 6. In the arm O are formed a series of spaced notches O' adapted to be engaged by a ball O² held in an opening in the bracket T and pressed on by a spring O³ resting on a screw O⁴ screwing in the bracket T and serving to regulate the tension of the spring O³. When the arm O is shifted as above described to either one of the end positions or the intermediate position, then the ball O² engages a corresponding notch, thus holding the arm O against accidental shifting.

Having thus described my invention, I claim as new and desire to secure by Letters Patent:

1. A sausage-filling machine, comprising a cylinder provided at one end with a closure and open at the other end, a spout at the closed end, a plunger reciprocating in the said cylinder, a rack extending from the said plunger through the open cylinder and provided with spaced shoulders, a driving gear having a reversing device and geared with the said rack, and a shifting device having means for engagement by the said spaced shoulders, the said shifting device being connected with the said reversing device to reverse the said gearing at the end of the forward stroke of the plunger and to stop the gearing at the end of the return stroke of the said plunger.

2. A sausage-filling machine, comprising a cylinder provided at one end with a closure and open at the other end, a spout at the closed end, a plunger reciprocating in the said cylinder, a rack extending from the said plunger through the open cylinder and provided with spaced shoulders, a driving gear having a reversing device and geared with the said rack, and a shifting device having means for engagement by the said spaced shoulders, the said shifting device being connected with the said reversing device to reverse the said gearing at the end of the forward stroke of the plunger and to stop the gearing at the end of the return stroke of the said plunger, the said shifting device having a manually-controlled lever for actuating the said shifting device to start the gearing.

3. A sausage-filling machine, comprising a cylinder provided at one end with a closure and open at the other end, a spout at the closed end, a plunger reciprocating in the said cylinder, a rack extending from the said plunger through the open cylinder and provided with spaced shoulders, a driving gear having a reversing device and geared with the said rack, a lever connected with the said reversing device, and a slide held on the said lever and provided with a pin for engagement by the said spaced shoulders.

4. A sausage-filling machine, comprising a cylinder provided at one end with a closure and open at the other end, a spout at the closed end, a plunger reciprocating in the said cylinder, a rack extending from the said plunger through the open cylinder and provided with spaced shoulders, a driving gear having a reversing device and geared with the said rack, a lever connected with the said reversing device and adapted to be actuated by an operator, and a slide having a spring-pressed and manually-controlled pin for engagement by the said spaced shoulders.

5. A sausage-filling machine, comprising a cylinder having a discharge spout, a plunger reciprocating in the said cylinder and provided with a rack, a gearing geared with the said rack and provided with a bevel gear wheel, a pair of alined pinion shafts mounted to slide and rotate in unison, bevel pinions in mesh with the said bevel gear wheel and loose on the said pinion shafts, clutches for connecting and disconnecting the said pinion shafts with their respective bevel pinions on shifting the pinion shafts, and a shifting device for the said pinion shafts and controlled by the said rack.

6. A sausage-filling machine, comprising a cylinder having a discharge spout, a plunger reciprocating in the said cylinder and provided with a rack, a gearing geared with the said rack and provided with a bevel gear wheel, a pair of alined pinion shafts mounted to slide and rotate in unison, bevel pinions in mesh with the said bevel gear wheel and loose on the said pinion shafts, clutches for connecting and disconnecting the said pinion shafts with their respective bevel pinions on shifting the pinion shafts, a driving shaft mounted to slide in unison with the said pinion shafts, sets of gear wheels connecting the said driving shaft with the said pinion shafts, and a shifting device engaging the said shaft and controlled by the said rack.

7. A sausage-filling machine, comprising a cylinder, provided at one end with a closure, a spout at the closed end, a plunger reciprocating in the said cylinder and having a rack extending through the said open cylinder end, the rack being provided with spaced shoulders, a driving gear having a reversing device and geared with the said rack, a shifting lever connected with the said reversing device, a slide connected with the said shifting lever, and a pin on the said slide for engagement by the said spaced shoulders on the said rack.

8. A sausage-filling machine, comprising a cylinder provided at one end with a closure, a spout at the closed end, a plunger reciprocating in the said cylinder and having a rack extending through the said open cylinder end, the rack being provided with spaced shoulders, a driving gear having a reversing device and geared with the said rack, a shifting lever connected with the said reversing device, a slide connected with the said shifting lever, a pin on the said slide for engagement by the said spaced shoulders on the said rack, and a manually controlled device for withdrawing the said pin.

9. A sausage-filling machine, comprising a cylinder, provided at one end with a closure, a spout at the closed end, a plunger reciprocating in the said cylinder and having a rack extending through the said open cylinder end, the rack being provided with spaced shoulders, a driving gear having a reversing device and geared with the said rack, a shifting lever connected with the said reversing device, a slide connected with the said shifting lever, a spring-pressed pin in the said slide for engagement by the said spaced shoulders on the said rack, and a manually controlled device for actuating the said pin.

In testimony whereof I have signed my name to this specification in the presence of two subscribing witnesses.

FERDINAND MATHEYER.

Witnesses:
 THEO. G. HOSTER,
 JOHN P. DAVIS.